US011243907B2

(12) United States Patent
Shah et al.

(10) Patent No.: US 11,243,907 B2
(45) Date of Patent: Feb. 8, 2022

(54) DIGITAL FILE RECOGNITION AND DEPOSIT SYSTEM

(71) Applicant: Bank of America Corporation, Charlotte, NC (US)

(72) Inventors: Anuj Shah, Jersey City, NJ (US); Sayan Banerjee, Marlboro, NJ (US); Ashwin Roongta, East Brunswick, NJ (US)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 16/211,310

(22) Filed: Dec. 6, 2018

(65) Prior Publication Data

US 2020/0183880 A1 Jun. 11, 2020

(51) Int. Cl.
*G06F 7/00* (2006.01)
*G06F 16/00* (2019.01)
*G06F 16/11* (2019.01)
*H04L 12/58* (2006.01)

(52) U.S. Cl.
CPC ............ *G06F 16/122* (2019.01); *H04L 51/08* (2013.01)

(58) Field of Classification Search
None
See application file for complete search history.

(56) References Cited

U.S. PATENT DOCUMENTS

| | | | |
|---|---|---|---|
| 9,069,768 B1* | 6/2015 | Sampson | G06K 9/00463 |
| 2005/0289182 A1* | 12/2005 | Pandian | G06K 9/00442 |
| 2007/0136198 A1* | 6/2007 | Foth | G06Q 20/40 705/44 |
| 2011/0091092 A1* | 4/2011 | Nepomniachtchi | G06K 9/00463 382/139 |
| 2013/0239185 A1* | 9/2013 | Orttung | H04L 63/08 726/5 |
| 2015/0012489 A1* | 1/2015 | Ceribelli | G06Q 30/04 707/611 |

\* cited by examiner

*Primary Examiner* — Tuan A Pham
(74) *Attorney, Agent, or Firm* — Weiss & Arons LLP

(57) ABSTRACT

Systems and methods for recognizing and depositing digital files. Receive an unidentified file. Identify a target client and at least one account associated with the unidentified file. Segment the unidentified file into one or more document images. For each document image: scan the image and extract content, label the image based on its content, select an account of the target client, and deposit the labeled image in the selected account.

8 Claims, 11 Drawing Sheets

FIG. 4C

DIGITAL FILE RECOGNITION AND DEPOSIT SYSTEM

FIELD OF TECHNOLOGY

Aspects of the disclosure relate to digital files. Specifically, aspects of the disclosure relate to digital image file recognition systems.

BACKGROUND OF THE DISCLOSURE

Digital files are commonly used for storing a wide variety of information. Digital files can be stored with more efficiency than physical files. Digital files can also be transmitted across vast distances with great speed and economy.

Important documents, forms, and images are often converted into, and even created as, digital files. In some exemplary scenarios, such digital files may be transmitted to an entity by clients, or prospective clients, of the entity. The transmission of the digital files may serve the purpose of verification, authorization, and/or information gathering. The transmission of the digital files may pertain to an active, or prospective (i.e., not yet active), account. The client may transmit the digital file over the internet, e.g., via email.

An entity may receive a large number of digital file transmissions. In many cases, the digital files received may be unidentified. Moreover, an individual digital file may contain more than one document, form, or image. The digital files may be most useful to the receiving entity when information contained in the files is accurately identified and labeled, and deposited in the appropriate accounts of the correct clients. It is a challenge to accurately deposit the contents of unidentified files, especially those containing multiple items. Inaccurate identification, labeling, and/or deposit can lead to the loss of vital information.

It would be desirable, therefore, to provide systems and apparatus for digital file recognition, disaggregation, and deposit.

SUMMARY OF THE DISCLOSURE

Aspects of the disclosure relate to an email plugin. The plugin may include computer executable instructions that, when run on a processor, are configured to receive, via email attachment, an unidentified file. The unidentified file may include at least one document image on one or more pages.

The plugin may identify a target client associated with the unidentified file. The plugin may further identify at least one account linked to the target client.

The plugin may segment the unidentified file into the one or more pages. For each page, the plugin may search a set of document templates for a matching document template. A matching document template may be a template that satisfies a threshold level of similarity to the page. The plugin may create an identifier for the page based, at least in part, on the matching document template.

The plugin may group the one or more pages into one or more sets of pages. Each set may include pages with matching identifiers. The plugin may define each set of pages as a unique document image.

For each document image, the plugin may create a labeled file. A labeled file may include the document image and a label identifying the labeled file based, at least in part, on the matching document template. The plugin may select an account from the at least one account for depositing the labeled file, and deposit the labeled file in the selected account.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIGS. 4A-4H show illustrative screenshots in accordance with principles of the disclosure.

DETAILED DESCRIPTION OF THE DISCLOSURE

Figure 1:
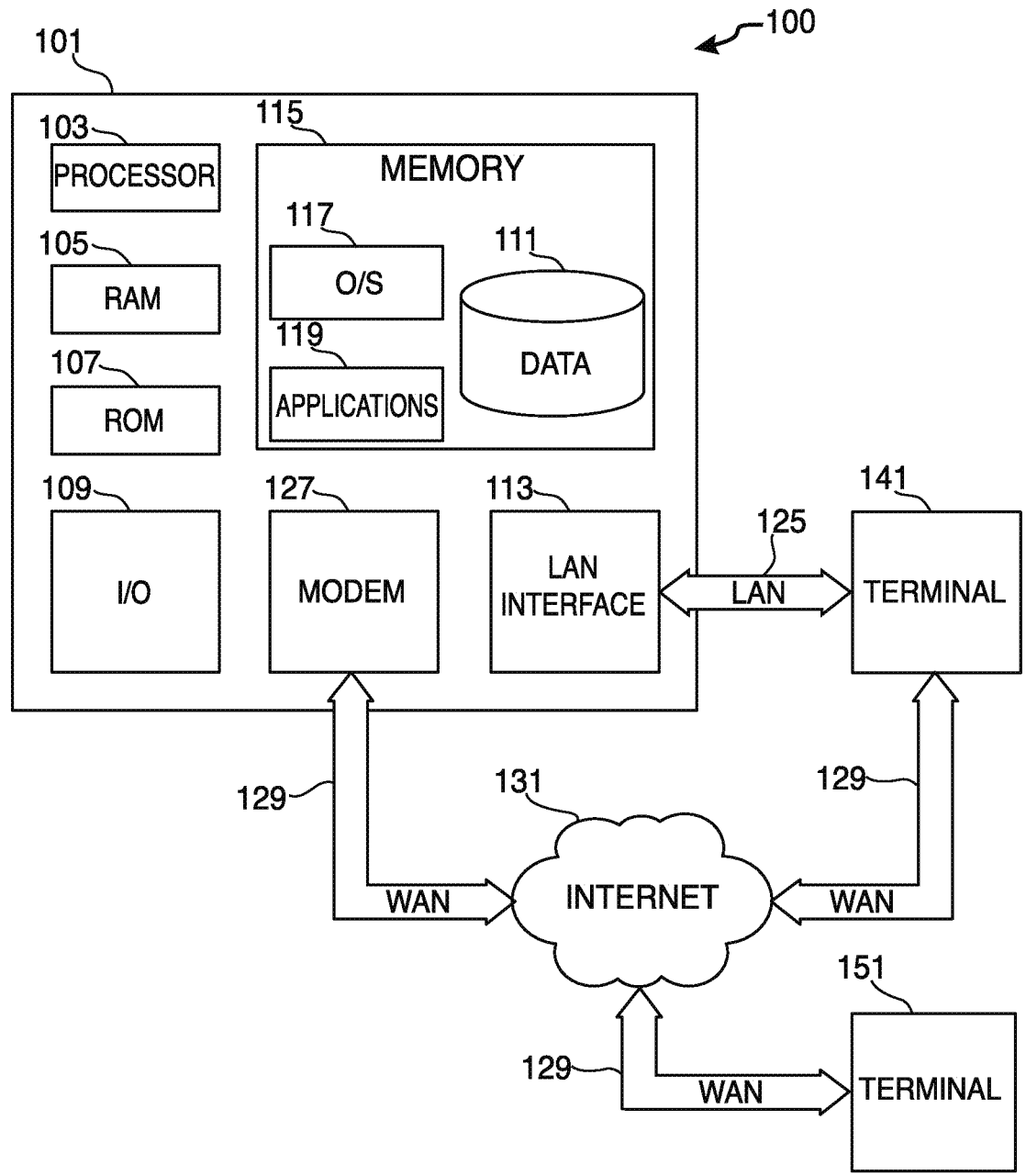
FIG. 1 shows an illustrative system in accordance with principles of the disclosure.

Aspects of the disclosure relate to a digital file recognition and deposit system. The system may include computer executable instructions running on a processor. The instructions may be stored in a non-transitory memory. The processor and/or the memory may be part of a computing device, such as a smartphone, tablet, laptop computer, or desktop computer. In some embodiments, the memory and/or processor may be part of a remote server or cloud.

A user may access the functionality of the system via a user interface ("UI"). The UI may include a screen for display. The UI may also include various other input/output ("I/O") components for receiving user input and producing output. Exemplary I/O components may include a keyboard, mouse, touchpad, touchscreen, speakers, and other such suitable I/O components.

In some embodiments, the system may be configured to operate as an email plugin. An email plugin may be an application designed to integrate with, or piggyback atop, an email messaging service. Examples of such email services include Microsoft Outlook, Gmail from Google, AOL, etc. The plugin may be displayed on a portion of the screen when the email service is running. In other embodiments, the system may be a software program or application that stands alone, or runs in conjunction with any other suitable service, program, or application.

The system may receive an unidentified file. The unidentified file may include at least one document image. The unidentified file may be unverified as to how many, and what type(s), of document images are contained within. A user of the system may wish to identify how many document images are contained in the file and what type of documents they represent. The user may also wish to deposit each document image in its appropriate location. Inaccurate deposit of the document images may be detrimental to a broader system within which the system is operating.

The unidentified file may be received via email attachment. In some embodiments, the unidentified file may be received in any other suitable manner or method. Other suitable methods may involve other digital messaging services, downloading from the internet or other digital network, transferring via digital memory device (e.g., USB device or hard drive), or receiving directly via an image capture device such as a scanner or camera. It is envisioned that, in certain embodiments, the system may be integrated with a native image capture device, for direct image capture, recognition, and deposit (e.g., a system configured to run on a computing device with a camera that can take a snapshot of an unidentified form, and directly recognize and deposit the form in the appropriate location).

The system may be configured to be operable with unidentified files of the following file formats: pdf (portable document format), png (portable network graphics), of/tiff (tagged image file format), jpg/jpeg (joint photographic experts group), gif (graphics interchange format), and pnp. In some embodiments, the system may be operable with other image formats, with text formats, or with any other suitable file format.

The system may identify a target client associated with the unidentified file. The identification of the target client may include extracting data about a sender of the unidentified file. For example, when the unidentified file is received via email, the email address of the sender of the email may be used to identify the target client. Any other sender data, such as a name, address, or other suitable identification number, may also be used to identify the target client. The email address, or other sender data, may be searched against a database of possible clients. In some embodiments, the sender data may be filtered. For example, if a sender email address contains a domain of an entity that is running the system, the system may recognize that the sender is not a client. In this scenario, the system may abort the process, look for other sender data, and/or issue an alert to the user.

In some embodiments, the system may identify the target client based on data extracted from the document images themselves. For example, the system may scan the document images for a signature and extract a client name from the signature. In other embodiments, a target client may be identified based on a customer service session conducted with a client. For example, if a user is conducting an in-person or telephonic customer service session with a client, any unidentified file received during the session may be associated with the client.

The system may further identify at least one account linked to the target client. In some embodiments, the system conducts a search of one or more account databases, based on the target client information, to obtain a list of all accounts associated with the target client.

In one example, a user of the system may be an associate at a financial institution. A target client may be a customer at the financial institution. The associate may receive a file attachment in an email from the customer. The system may identify the customer and obtain a list of all the accounts associated with the customer at the financial institution. Examples of such accounts may include Trust accounts (various types including revocability, Trust under will, etc.), Investment accounts (including Management/Advisory), Custody, Estate, as well as banking accounts such as checking, savings, CDs, IRAs, Direct Deposit Accounts (DDAs), and credit and debit card accounts. The accounts may include other financial accounts, or any other suitable account.

In some embodiments, the accounts obtained by the system may include work-in-progress ("WIP") accounts. A WIP may be an account that is currently undergoing modification and/or initiation. A WIP may be a prospective account. A prospective account may include an account that is not yet active. The account may be not yet active because it is in the process of being set up, approved, or initialized. A WIP may, in certain embodiments, be associated with a unique identifier that is different from the identifier of the account being worked on. Because each WIP is generally linked to a unique account, for the purposes of this disclosure, the terms "WIP" and "account" may sometimes be used interchangeably.

In some embodiments, the system may filter the accounts. For example, in certain embodiments, only WIPs, or any other account type criterion, may be displayed to a user. The filtering may be manual or automatic.

The system may extract the document images from the unidentified file. The extraction may include the use of optical character recognition ("OCR"). The OCR may, in some embodiments, be used to extract the complete content of the document images. In other embodiments, the system may only extract a targeted portion of the document images. For example, the system may scan the document images for a header, or any other predetermined target portion or sets of portions.

The system may, for each of the document images, search a set of document templates for a matching document template. A matching document template may satisfy a threshold level of similarity to the document image.

The system may create a labeled file. The labeled file may include the document image and an identifying label. The identification may be based, at least in part, on the matching document template.

In an illustrative example, the document image may be a photo of a driver's license. The system may extract all or part of the license image (this may include the overall shape, features such as a photo box in a certain location, and/or various barcodes and identification numbers on the license). The system may compare the results of the extraction to a set of document templates that may include a driver's license template. The system may match the image to certain known templates (such as a NY license, a CA license, etc.). The comparison may satisfy a predetermined threshold, e.g., 90% of the features are a match. The threshold may be set to account for different versions of the same document, and/or differences due to the process, such as an unclear photo or an inaccurate OCR extraction. In some embodiments, the threshold may be substantially 100%, or any other suitable value.

The system may create a labeled file that associates the document image as a "driver's license" (or any other suitable label, such as a more general "form of ID," or a more specific "NYS driver's license"). The label may be appended to the file name. In some embodiments, the label may be stored as metadata linked to the document image.

In another exemplary embodiment, the system may initially segment the unidentified file into pages. The segmentation may be based on a retrieved file pagination. The segmentation may also be based on features extracted from the file appearance, such as dark or light bars interspersed at certain locations of the file.

The system may perform the extraction on each page. As described in the preceding paragraphs, the extraction may employ OCR. The extraction may utilize the entirety of each page, or, alternatively, a portion thereof. For example, a page may include a header and/or a footer. The header may include a barcode and/or an alphanumeric document code. The alphanumeric document code may also be referred to herein as a form identification ("ID") number. The barcode and/or form ID may be unique to a specific form type.

In the current example, the system may extract the barcode and/or form ID from the header of each page. The system may search a database for a template that matches the barcode and/or form ID. A mapping may exist between the possible barcodes and/or form IDs, and the possible document types. A document type that satisfies the mapping may satisfy the threshold similarity. The threshold similarity may be satisfied even when the rest of document image does not exactly match the document type. The system may create an identifier for each page based on the document type that satisfied the threshold similarity.

Once each page is thus identified, the system may check if multiple pages share an identifier. Multiple pages sharing an identifier may indicate that the multiple pages belong to the same document. The system may group the pages into uniform sets, each set preferably containing all the pages that share an identifier. The system may stitch together the pages of a multi-page set, and define each set as a unique document image.

In some embodiments of the system, the set of document templates may include one or more contractual forms, one or more financial forms, and/or one or more identification documents. Identification documents may include government issued IDs (e.g., driver's license, passport, birth certificate, marriage license, etc.). Some sample financial forms that may be supported by the system, and included in the set of document templates, may include: Investment Services Agreement (ISA), Philanthropic ISA, Wire Transfer Profile (WTP), and other standard and non-standard client provided documents. Any other suitable forms and documents may be supported as well.

The system may select an account, from the accounts of the target client, for depositing the labeled file. The selection may be based on user input. In some embodiments, the selection may be automatically performed based on a predetermined mapping between documents and accounts.

The system may deposit the labeled file in the selected account. Depositing a file in an account may include sending the file to a dedicated file repository. Sending the file to the repository may include associating the file with metadata. The metadata may include data that identifies the document type contained in the file, the target customer (identified, for example, by name and/or unique customer ID number) associated with the file, and an account number or WIP ID linked to the file.

In some embodiments, the system may be further configured to extract data from the document image. The data may include content of the document image, such as information in data fields of the document. The system may further update a database with the data. Updating the database may be an important step in executing the task for which the target client sent the unidentified file. For example, when a customer sends a document containing data pertaining to an account initialization to a financial entity, the system may enter the data into a database of the financial entity in order to initialize the account.

In some embodiments, an email plugin is provided. The plugin may include computer executable instructions that, when run on a processor, are configured to receive, via email attachment, an unidentified file. The unidentified file may include at least one document image on one or more pages.

The plugin may identify a target client associated with the unidentified file. The plugin may further identify at least one account linked to the target client.

The plugin may segment the unidentified file into the one or more pages. For each page, the plugin may search a set of document templates for a matching document template. A matching document template may be a template that satisfies a threshold level of similarity to the page. The plugin may create an identifier for the page based, at least in part, on the matching document template.

The plugin may group the one or more pages into one or more sets of pages. Each set may include pages with matching identifiers. The plugin may define each set of pages as a unique document image.

For each document image, the plugin may create a labeled file. A labeled file may include the document image and a label identifying the labeled file based, at least in part, on the matching document template. The plugin may select an account from the at least one account for depositing the labeled file, and deposit the labeled file in the selected account.

In some embodiments of the plugin, each page may include a header. The header may include a barcode and/or a document code.

In certain embodiments, satisfying a threshold level of similarity to a page may include satisfying a predetermined mapping. The mapping may map the set of document templates to a set of possible headers.

In some embodiments of the plugin, the computer executable instructions may be further configured to extract data from the document image. The plugin may further be configured to update a database with the data.

In certain embodiments of the plugin, the set of document templates may include one or more contractual forms, one or more financial forms, and/or one or more identification documents.

In some embodiments, the plugin may be configured to be operable with unidentified files of the following file formats: pdf, png, tif, jpg, jpeg, gif, and pnp.

The plugin may be further configured to support a prospective account as well as an active account. In some embodiments, accounts supported by the plugin may include trust, investment, custody, estate, and/or banking accounts.

A method for digital file recognition and deposit is provided. The method may be performed by computer executable instructions running on a processor. The method may include receiving an unidentified file. The unidentified file may include at least one document image on one or more pages.

The method may include identifying a target client associated with the unidentified file, and further identifying at least one account linked to the target client.

The method may include segmenting the unidentified file into its constituent pages. For each page, the method may include searching a set of document templates for a matching document template. A matching document template may satisfy a threshold level of similarity to the page. The method may further include creating an identifier for the page based, at least in part, on the matching document template.

The method may include grouping the pages into one or more sets of pages. Each set may include pages that have matching identifiers. Each set of pages may be defined as a unique document image.

The method may include creating a labeled file for each document image. The labeled file may include the document image and a label identifying the labeled file. The identifying may be based, at least in part, on the matching document template. The method may include selecting an account of the target client, and depositing the labeled file in the selected account.

In some embodiments of the method, each page may include a header. The header may include a barcode and/or document code. In certain embodiments, satisfying a threshold level of similarity to a page may include satisfying a predetermined mapping between the set of document templates and the header.

The method may include extracting data from the document image. A database may be updated with the data.

In some embodiments, the method may be executed as an email plugin. In some embodiments, the unidentified file may be received as an email attachment.

In certain embodiments of the method, the set of document templates may include one or more contractual forms, one or more financial forms, and/or one or more identification documents.

In some embodiments, the at least one account of the target client may include one or more of the following account types: trust, investment, custody, estate, and banking accounts. In certain embodiments, each of the accounts may be either an active account or a prospective account.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may be included in a transfer event or an escape event. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. The transmission of the data together with computer-readable instructions may enable the computer system to quickly retrieve the data, when needed. Because the computer system is able to quickly retrieve the data, the web-based server may not need to stream the data to the computer system. This may be beneficial for the computer system, because the retrieval may be faster than data-streaming. Users may not become frustrated because they do not need to wait to run the applications. Conventionally, streaming data requires heavy usage of the processor and the cache memory. If the data is stored in the computer system's memory, retrieval of the data may not require heavy processor and cache memory usage. Any of various conventional web browsers can be used to display and manipulate retrieved data on web pages.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to recognizing, labeling, indexing, disaggregating, and/or depositing files.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement services provided by the system, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
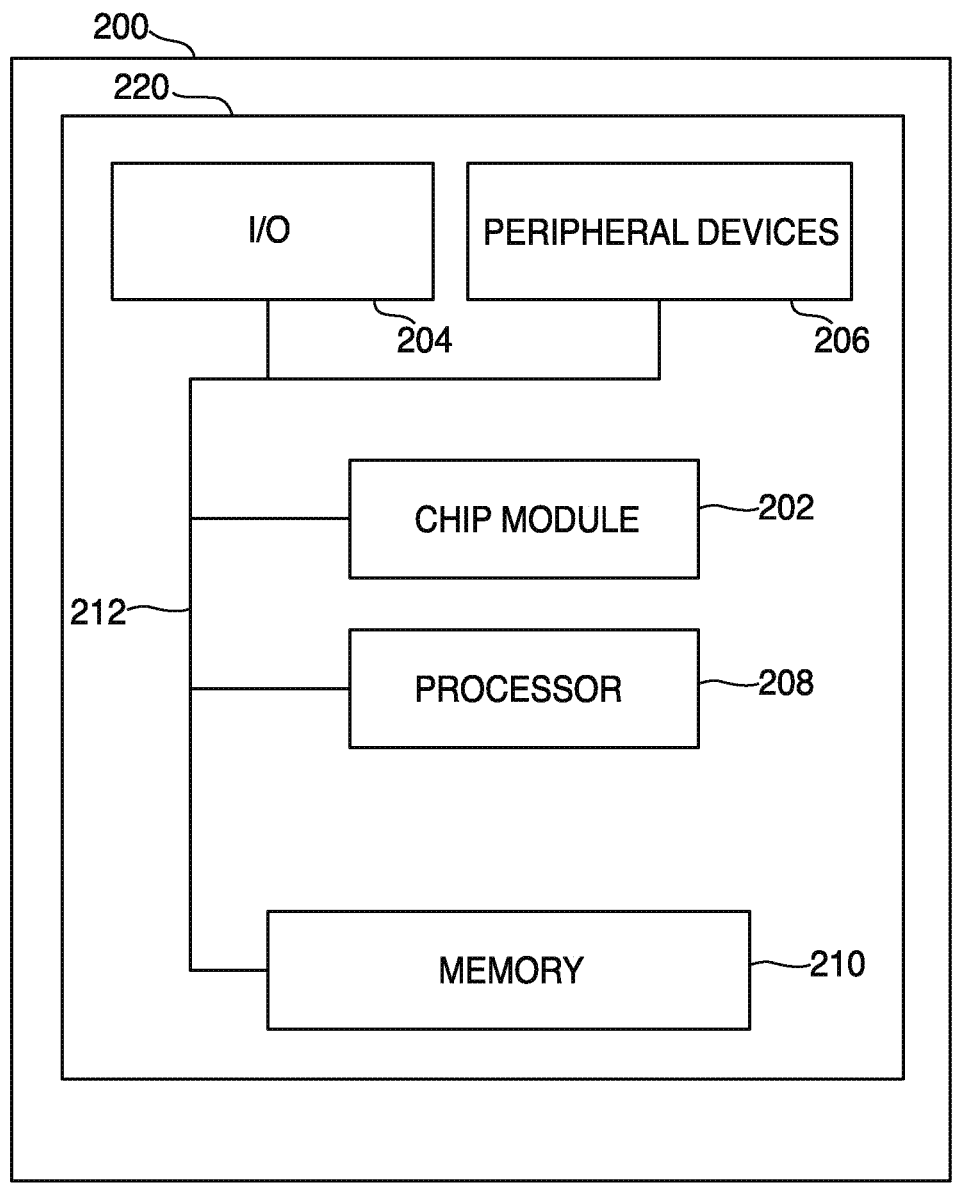
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
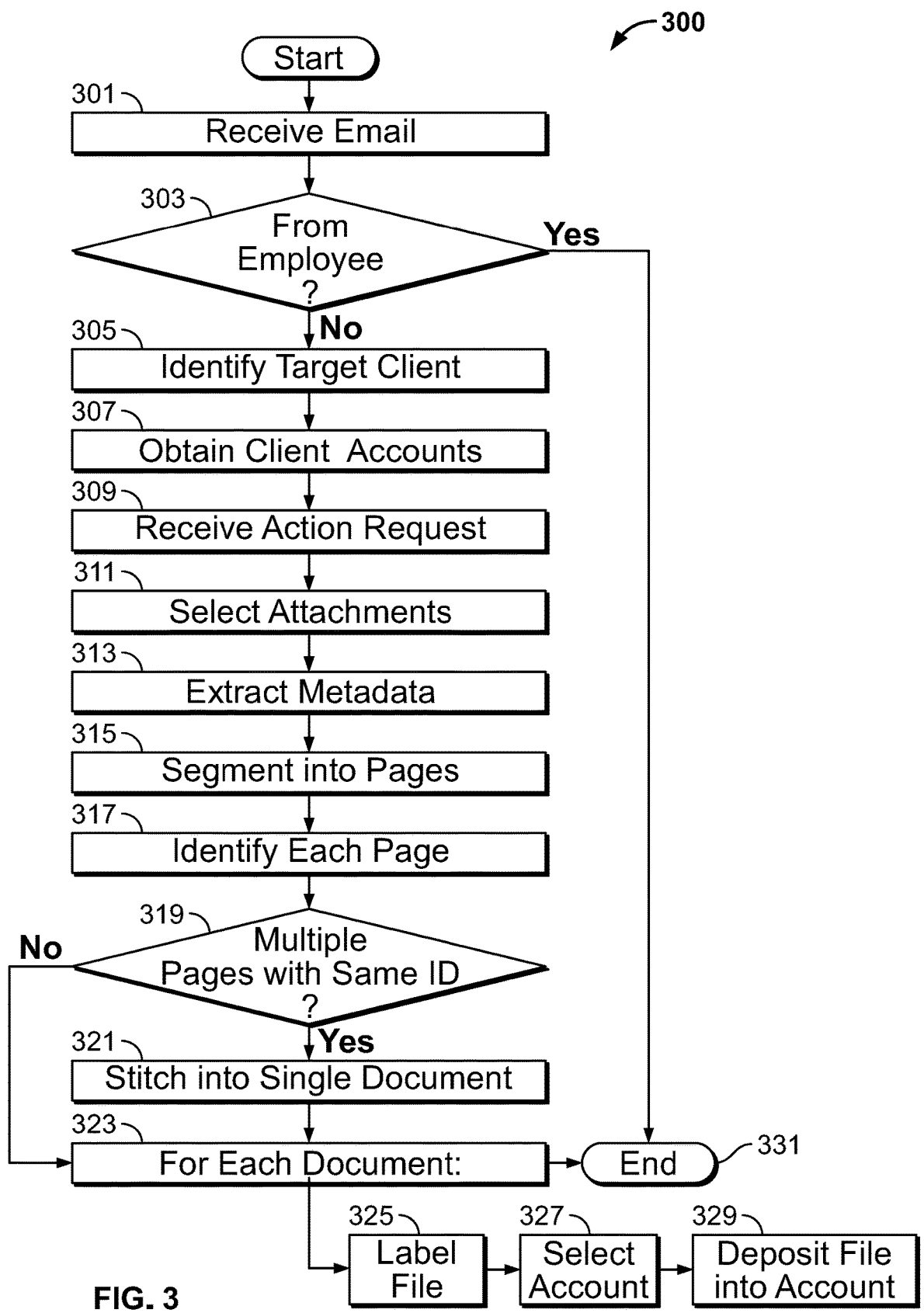
FIG. 3 shows an illustrative flowchart in accordance with principles of the disclosure.

FIG. 3 shows illustrative flowchart 300 in accordance with aspects of the disclosure. Flowchart 300 may show steps according to some exemplary embodiments of the disclosure. Other embodiments may skip steps, replace steps, and/or include additional steps. Some embodiments may include different orderings of the steps.

Flowchart 300 begins with step 301. At step 301 an unidentified file is received, e.g., via email. Step 303 may filter the email by checking if the sender is an employee of the entity running the system. If the sender is an employee, the process may skip directly to the end, step 331.

If the sender is not an employee, the system may identify a target client at step 305. Identifying a target client may include searching a client database using an email address or any other suitable identifying information. Once a target client is identified, the system may obtain a list of client accounts at step 307. In some embodiments, steps 305 and 307 may be executed together.

At step 309, the system may receive an action request. An action request may include a user selection. A user selection may, in some embodiments, include selecting an option, such as a button, displayed on a screen. The button may be part of an email plugin displayed on the screen. In some embodiments, the system may perform step 309 autonomously, e.g., automatically performing the process when an email is received with an unidentified file.

At step 311, the system may select unidentified files, which may be attachments in the embodiment of flowchart 300. Selecting files may include displaying the available files on a pop-up window. The available files may be presented with selectable buttons, such as radio buttons, for the user to select a file for processing. In some embodiments, other selection schema may be used. In yet other embodiments, the system may automatically process all the available files with minimal or no user input.

Step 313 may include extracting metadata about the file. Step 315 may include segmenting the file into pages. Step 317 may include identifying each page. This step may identify the content contained in the file. The content may include various forms and documents. The content may also include any other content contained in a file supported by the system. In some embodiments, if the system does not recognize the identity of a page, the system identifies the page as "miscellaneous."

Each page with a unique identifier may be defined as a document image. At step 319, the system may check if multiple pages were identified with the same ID, which may indicate that the multiple pages are part of the same form or document. If there are multiple pages with the same ID, the system may stitch them together at step 321. Stitching multiple pages together may include storing them together, e.g., in the same data structure. Alternatively, stitching may include any other suitable way for associating the pages together, as part of the same document image.

At step 323, the system may run a multi-step process for each document image identified in the file. The multi-step process may include labeling the image as a labeled file, 325, selecting an account, 327, and depositing the labeled file into the selected account, 329. When all the documents in the file are processed, the process may end at step 331.

FIGS. 4A-4H show screenshots of a system in accordance with aspects of the disclosure. The screenshots may show different steps of the same session. In the particular example shown, the session includes a user using the system to identify and deposit multiple unidentified files received as attachments on a single email message. The user may, in some embodiments, prefer to use the system in conjunction with an account opening portal, or any other suitable portal or application.

The screenshots show one exemplary embodiment. Other embodiments may include less, more, and/or other features, and the features may be displayed in a manner other than displayed in the exemplary screenshots.

Figure 4A:
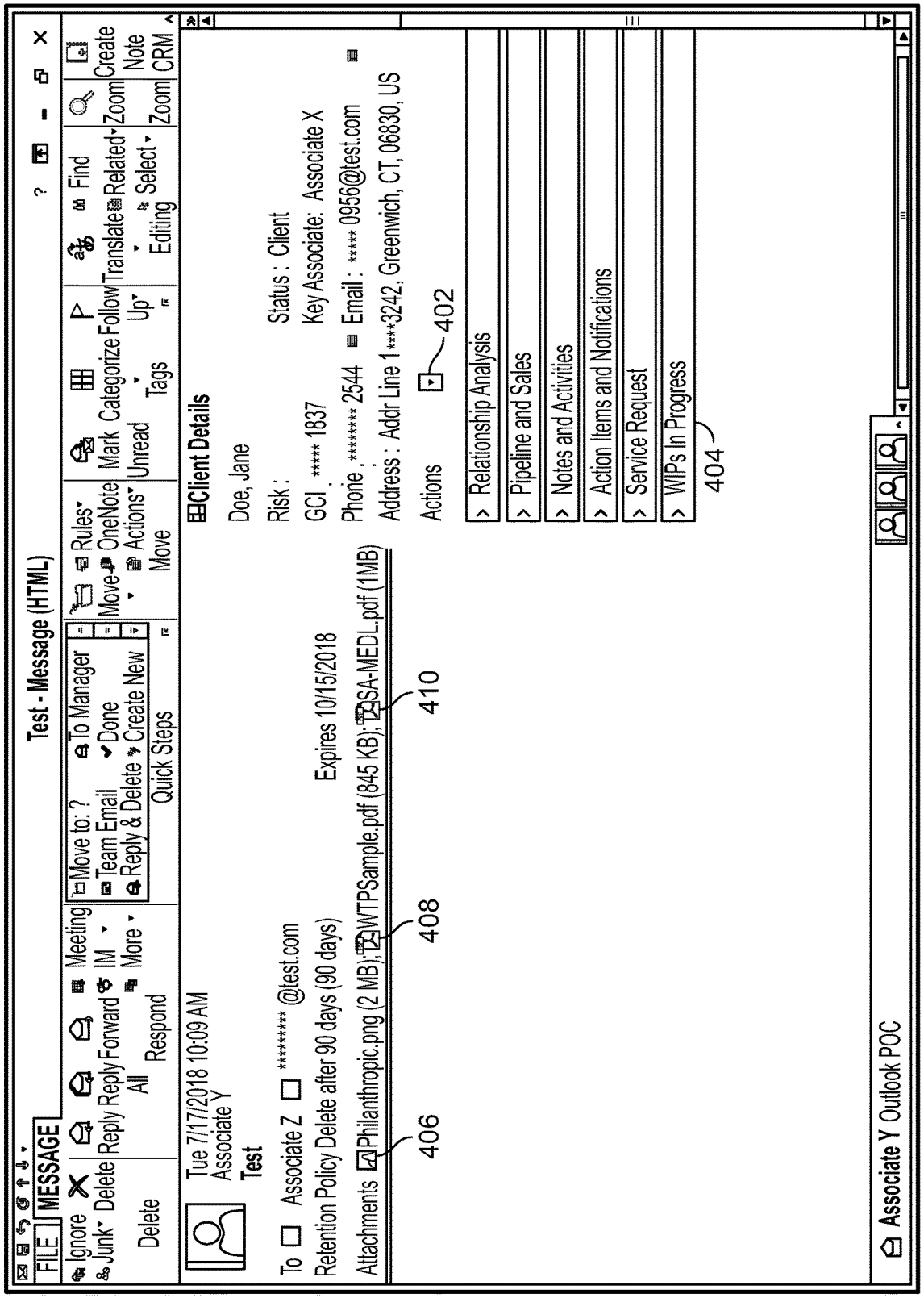
Figure 4B:
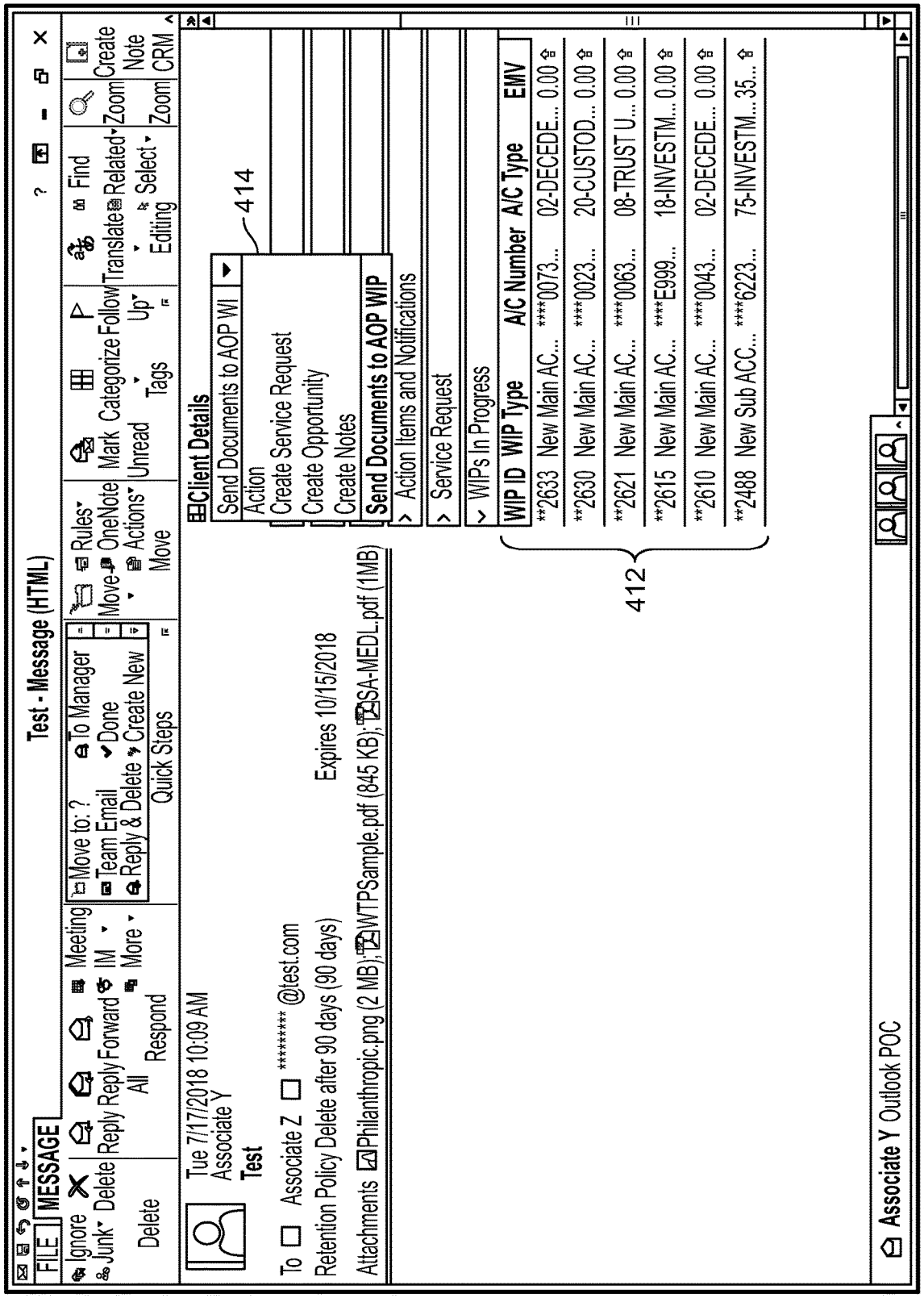

FIG. 4A shows screen 400. Screen 400 may be an email service running on a computing device. The email service may, in this exemplary embodiment, be Microsoft Outlook or similar. The attachments 406-410 may be three unidentified files received in a particular email.

The right-hand portion of screen 400—the portion between (inclusive) the label "Client Details" and menu bar 404 ("WIPs in Progress")—may be a plugin of the system configured to integrate with the email service.

The plugin may display details of a client identified as the target client. The details may include name, status, phone number, email address, and/or other suitable information. The displayed information may be seen in FIG. 4A below the label "Client Details."

The plugin may include a drop-down menu 402. Menu 402 may include a list of available actions for a user to select. User selection of an action item may trigger the system to execute a process, such as identifying and depositing an attachment.

The plugin may include various bar menus, including menu 404. Menu 404 may be selectable. Selecting menu 404 may trigger display of a list of WIPs associated with the target client.

Screenshot 4B may show screen 400 after a user selected drop-down menu 402 (from FIG. 4A) and the bar menu 404 (also from FIG. 4A).

WIP list 412 may include a list of WIPs obtained by the system that are associated with the target client. Each row in list 412 may show a unique WIP. The columns in list 412 may show various information associated with each WIP. The information may include an account number.

Options list 414 may include available actions for user selection. The bottom option, "Send Documents to AOP WIP" may be bold to indicate it has been selected. Selecting the option may initiate features of the system shown in FIGS. 4C-4H.

Figure 4C:
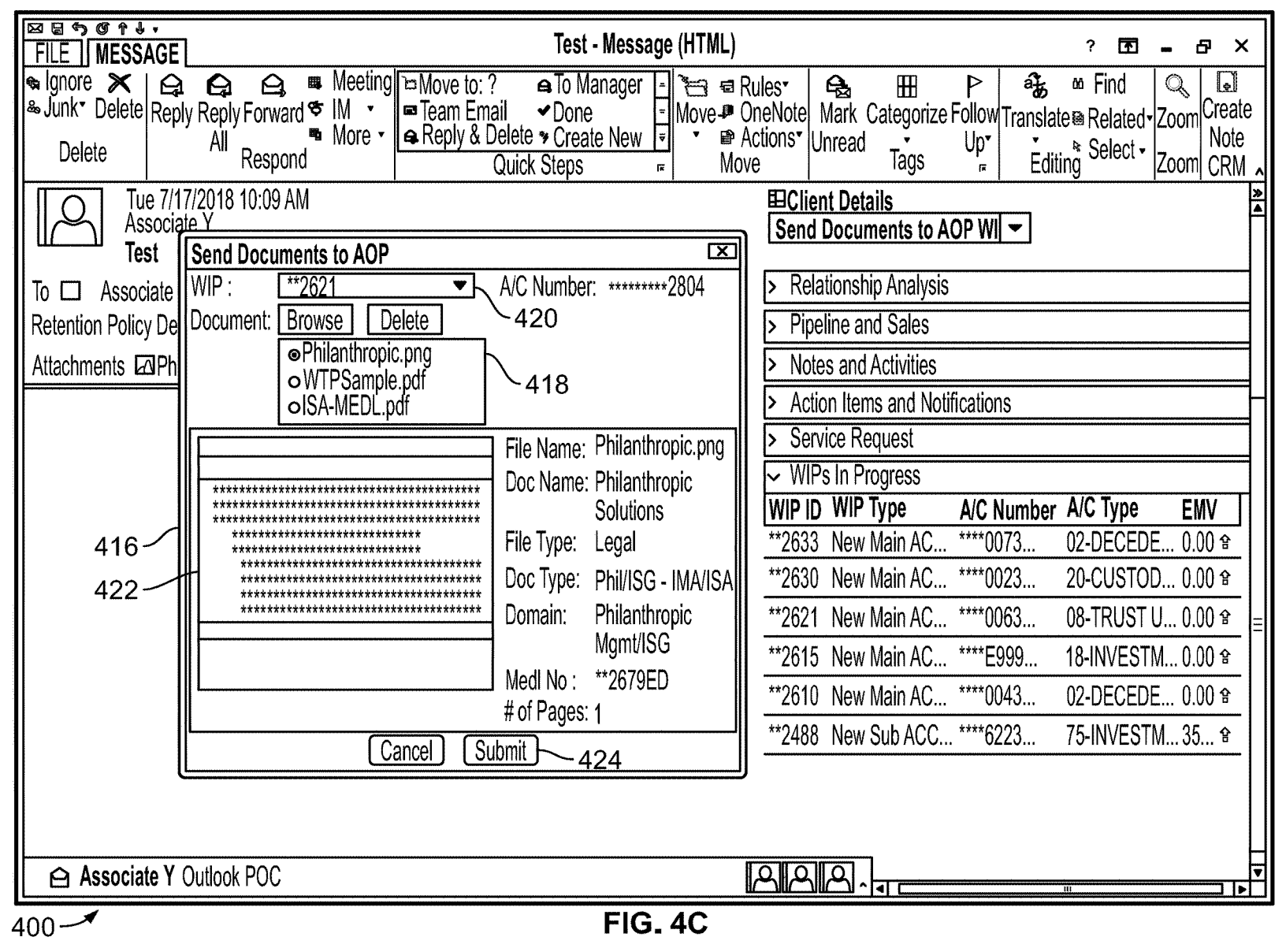

FIG. 4C may a show screen 400 with pop-up window 416. Window 416 may be initiated in response to selection of option "Send Documents to AOP WIP" included in options list 414 shown in FIG. 4B.

Window 416 may include field 418. Field 418 may include a list of available unidentified files received by the system, e.g., as email attachments. In the example of FIG. 4C, the 3 email attachments are shown with radio buttons, and the file "Philanthropic.png" is shown as selected. The image contained in the selected file may be displayed in window 422.

Window 416 may include field 420. Field 420 may include a selected account and/or a WIP for depositing the file. In some embodiments, field 420 may include a menu of selectable accounts. On other embodiments, field 420 may be a text field that a user can input with a number. In other embodiments, the system may automatically select an account for deposit. In still other embodiments, the system may automatically select a suggested account, and the user may be presented a menu for the option of selecting an account other than the suggested account.

Window 416 may also display data, or metadata, associated with the selected file. The data may include File Name, Doc Name, File Type, Doc Type, Domain, Medl No., and # of pages. The data may include data extracted from the file. The data may include a label generated based on identifying the file. Window 416 may include a submit button 424. Selecting submit button 424 may deposit the file in the selected account.

Figure 4D:
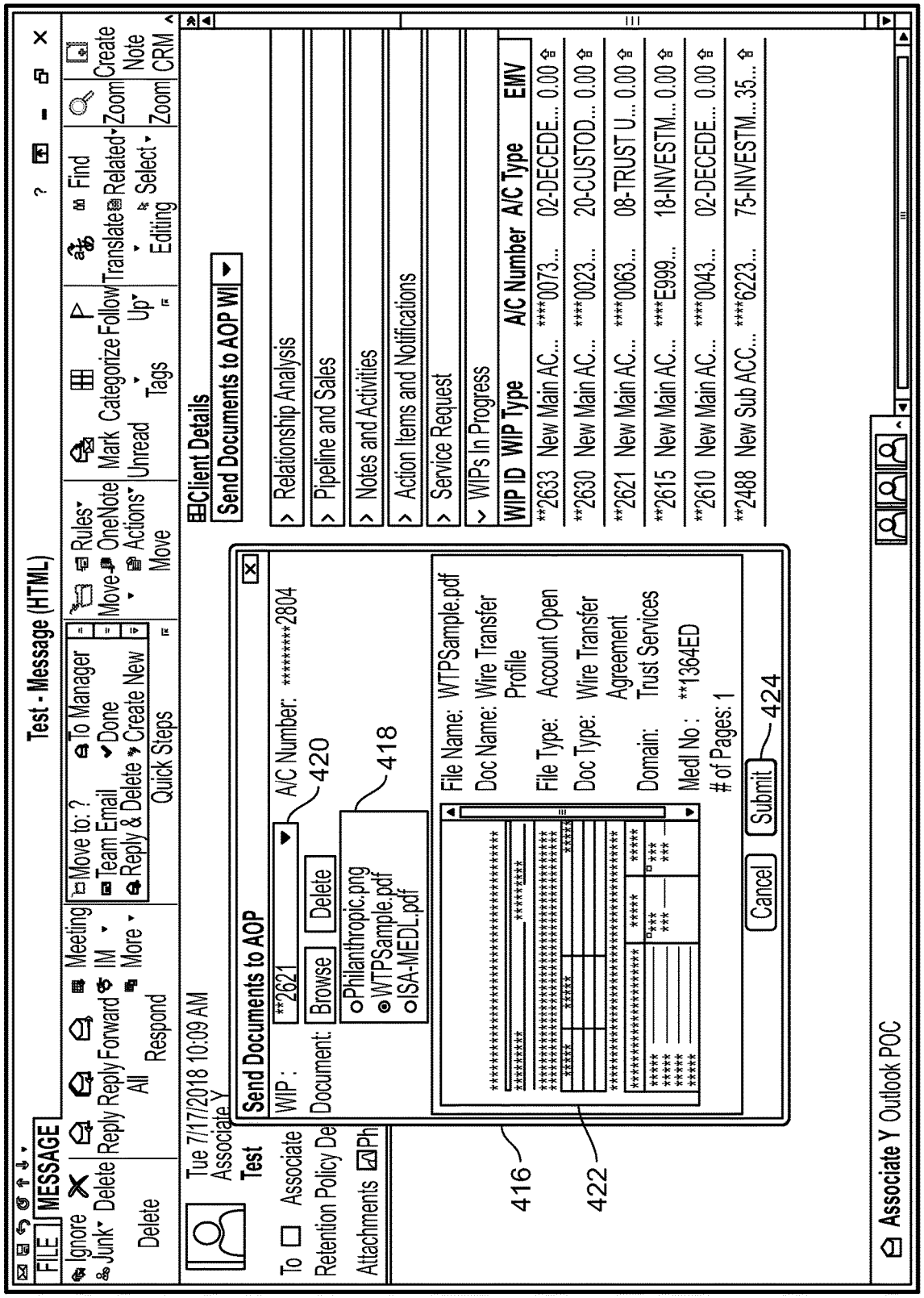
Figure 4E:
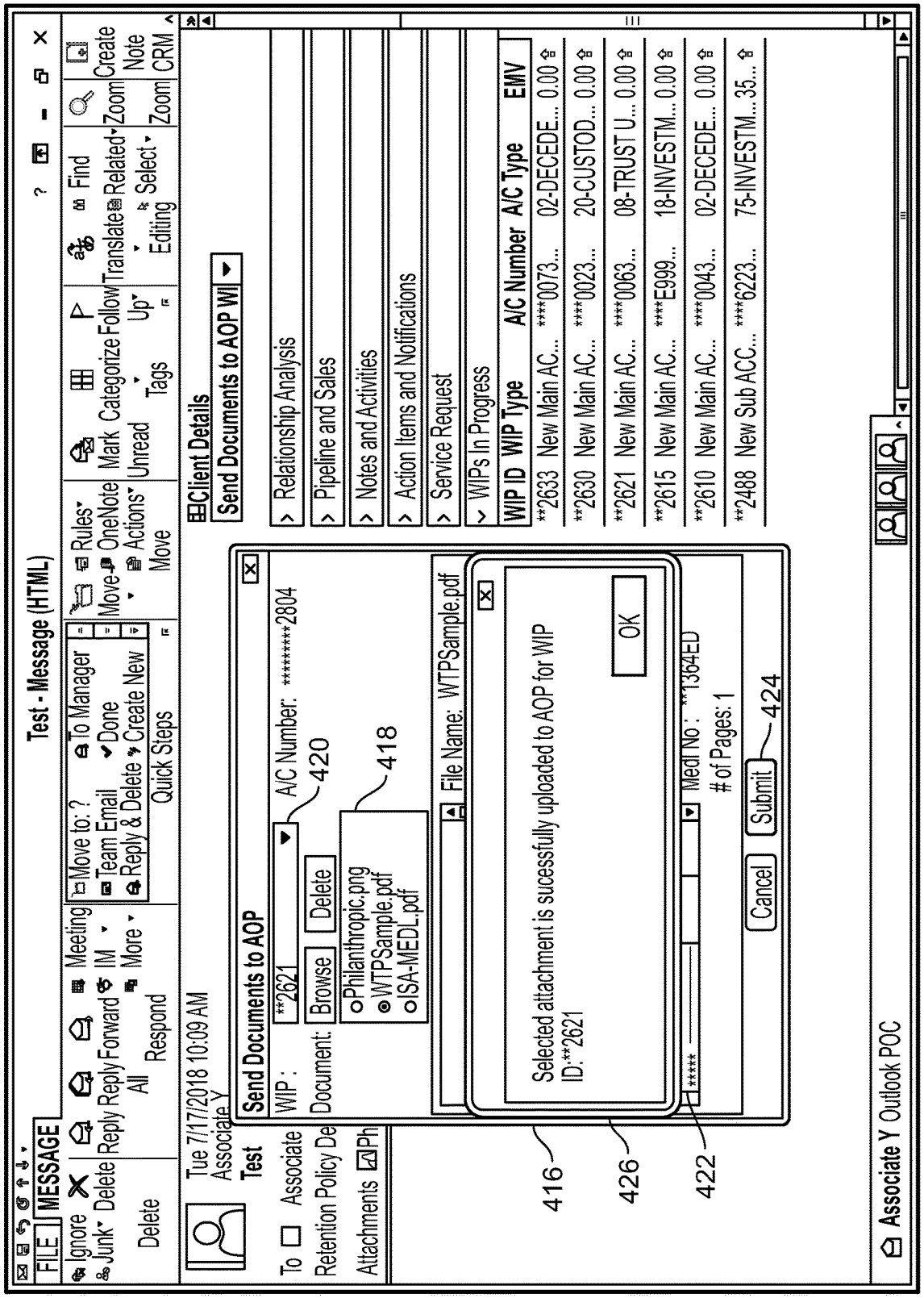

FIG. 4D may show a screenshot of window 416 with a different file selected in field 418. In the screenshot of FIG. 4D, the attachment file "WTPSample.pdf" may be selected. Field 420 in FIG. 4D may include a selected account and/or a WIP for depositing the file. Depending on the case, the WIP may be the same or different from the WIP in field 420 of FIG. 4C.

Window 416 in FIG. 4D may display data associated with the selected file. The data may be different than the data displayed in window 416 shown in FIG. 4C. Window 422 may also show an image of the selected file. Selecting submit button 424 may deposit the selected file in the selected account. Successful deposit of the file may trigger display of confirmation window 426 shown in the screenshot of FIG. 4E.

Figure 4F:
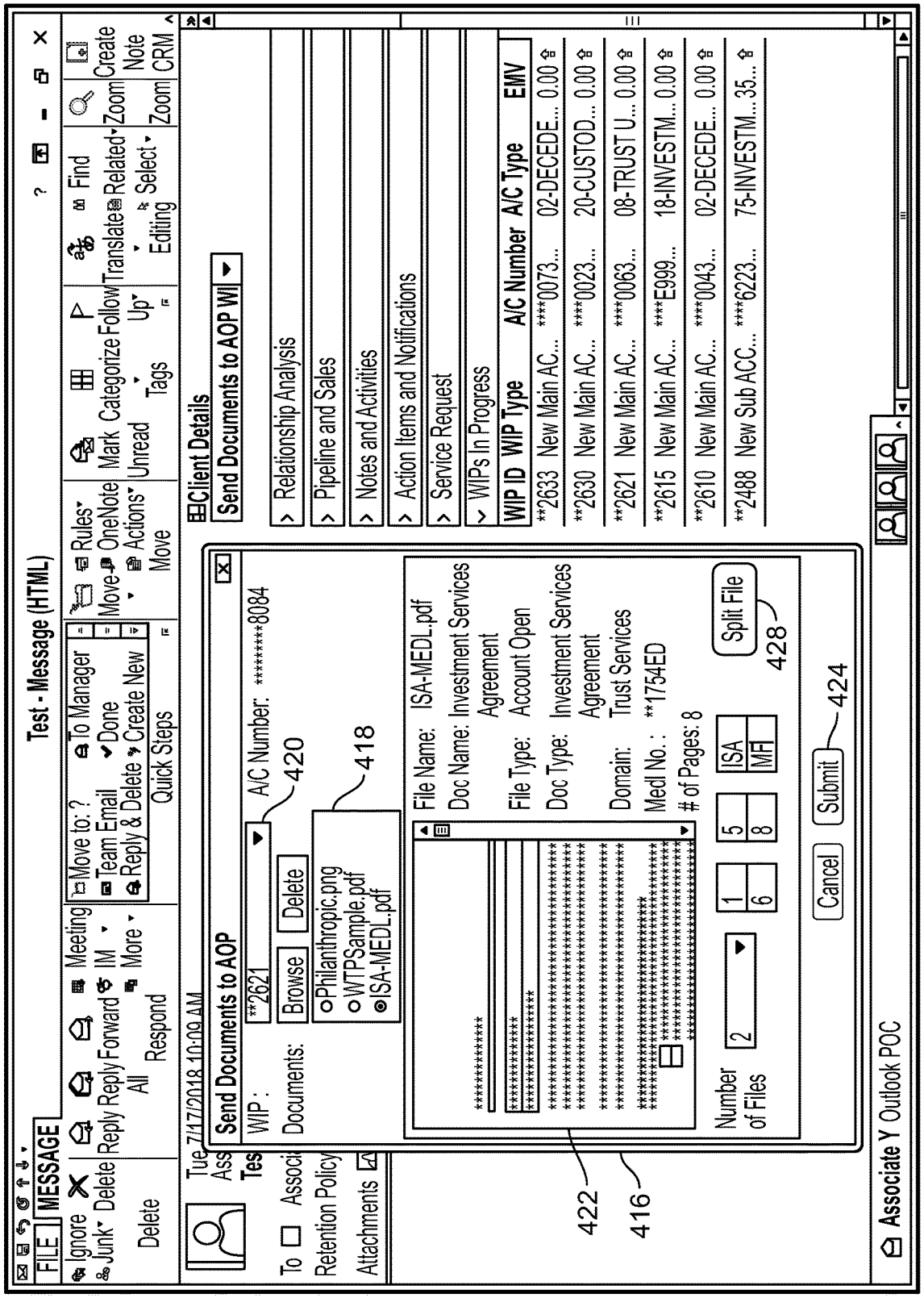

FIG. 4F may show a screenshot of window 416 with a different file selected in field 418. In the screenshot of FIG. 4F, the attachment file "ISA-MEDL.pdf" may be selected. Window 416 may display data associated with the selected file. The data may be different than the data displayed in window 416 shown in FIGS. 4C and 4D. Window 422 may also show an image of the selected file.

The file selected in FIG. 4F may include two documents. The system may recognize that two documents are contained in the file, and also identify the document type of each document. Window 416 may indicate that 2 files are present, and show information about each. The information may include a number of pages and an identified document type for each document.

Window 416 may also, in the scenario of FIG. 4F, be augmented to include button 428 which presents the option of splitting the file. Selecting button 428 may cause the system to split the file into the two documents. Selection of button 428 may also cause the system to modify the content of window 416.

Figure 4G:
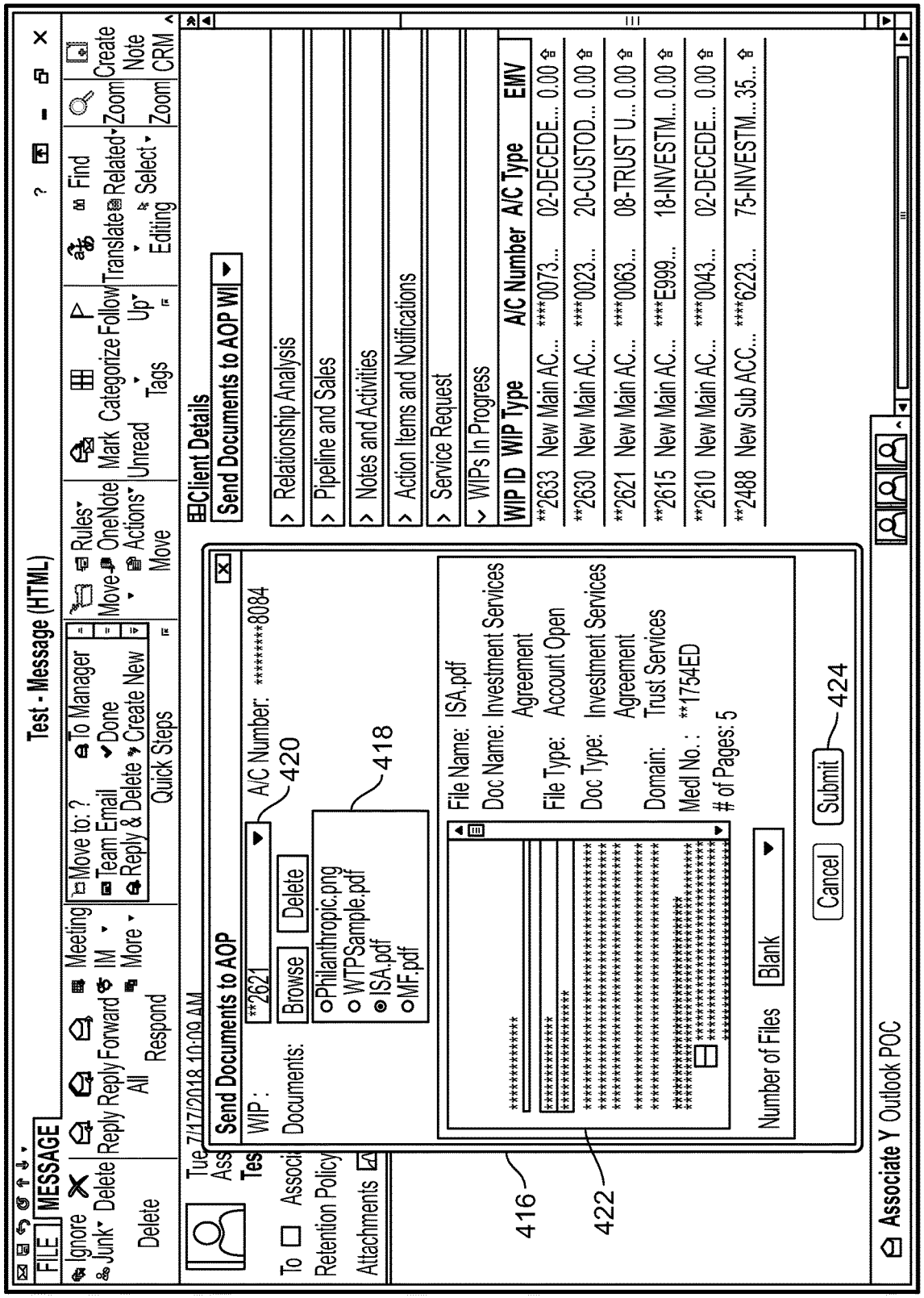
Figure 4H:
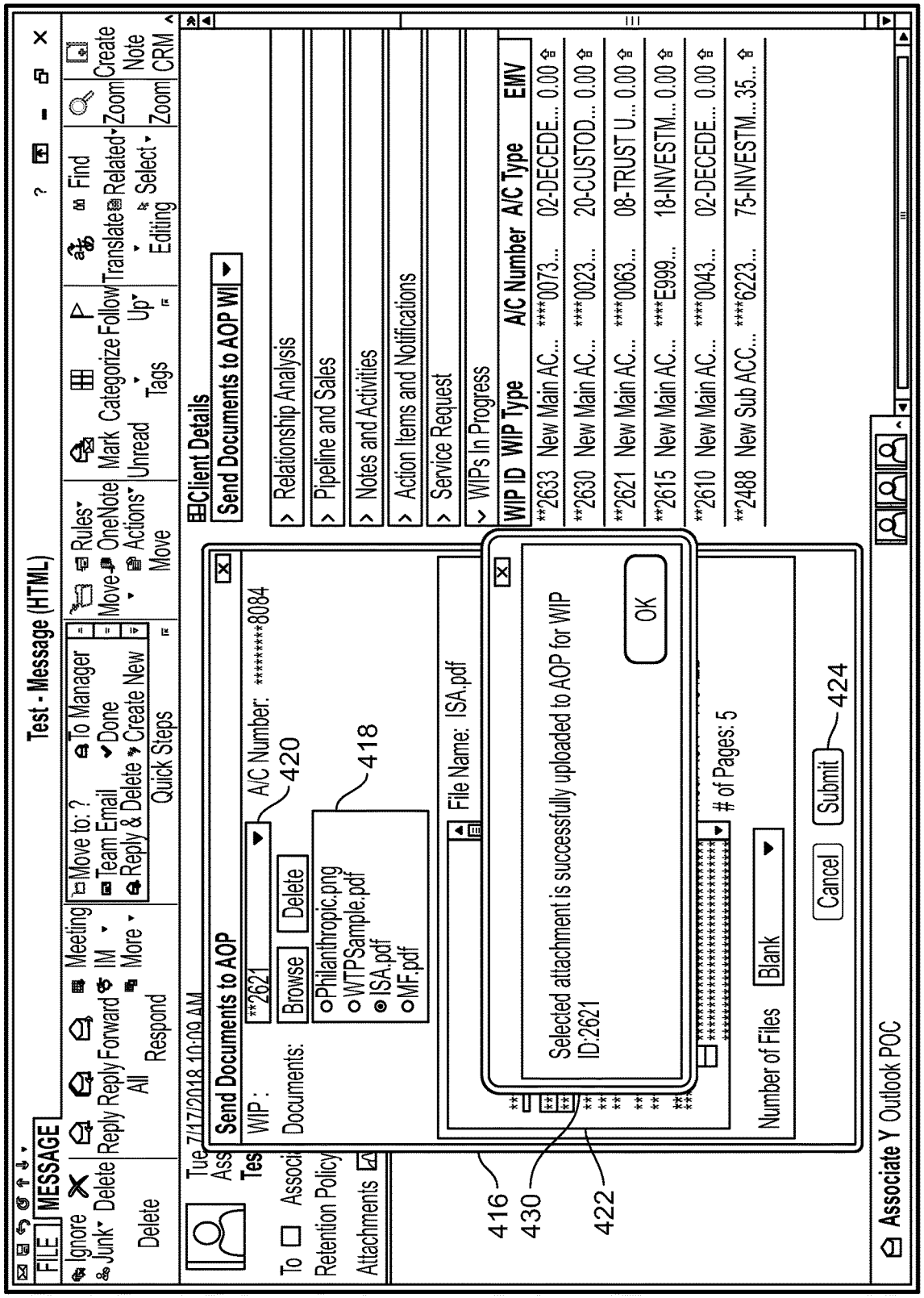

Window 416 with modified content (after selection of button 428 in FIG. 4F) is shown in the screenshot of FIG. 4G. Window 418 in FIG. 4G shows that 4 files are now available, "ISA-MEDL.pdf" having been split into "ISA.pdf" and "MF.pdf."

Selecting submit button 424 may deposit the selected file in the selected account. Successful deposit of the file selected in FIG. 4G may trigger display of confirmation window 430 shown in the screenshot of FIG. 4H.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for digital file recognition and deposit are provided. Persons skilled in the art will appreciate that the present invention can be practiced by other than the described embodiments, which are presented for purposes of illustration rather than of limitation, and that the present invention is limited only by the claims that follow.

What is claimed is:

1. A digital file recognition and deposit system, said system comprising:
 a processor; and
 a non-transitory memory storing computer executable instructions that, when run on the processor, are configured to:
  receive, via email, an unidentified file comprising at least one document image;
  extract metadata from the email, said metadata comprising a sender of the email;
  automatically identify, based on the sender of the email and in conjunction with information stored in a database, a target client associated with the unidentified file;
  automatically identify, based on the target client and in conjunction with information stored in the database, at least one account linked to the target client;
  extract the at least one document image from the unidentified file; and
  for each of the at least one document images:
   search a set of document templates for a matching document template that satisfies a threshold level of similarity to the document image, wherein satisfying the threshold level of similarity to the document image comprises satisfying a predetermined mapping between the set of document templates and a header on each document image, said header comprising a barcode and/or an alphanumeric document code;
   create a labeled file, said labeled file comprising the document image and a label identifying the labeled file based, at least in part, on the matching document template;
   select an account from the at least one account based, at least in part, on a predetermined mapping between document types and account types, for depositing the labeled file; and
   deposit the labeled file in the selected account;
 wherein, when the unidentified file comprises one or more pages, the computer executable instructions are further configured to:
  segment the unidentified file into the one or more pages;
  define each page as a document image;
  for each page of the one or more pages, execute the search for a matching document template, and create an identifier for the page based, at least in part, on the matching document template;
  group the one or more pages into uniform sets, each uniform set comprising one or more pages that have matching identifiers;
  for each uniform set that comprises more than one page, stitch the more than one page of the uniform set into a single document image; and
  perform the create, select, and deposit for each document image.

2. The system of claim 1, wherein the barcode and/or alphanumeric document code is extracted from the header using optical character recognition ("OCR").

3. The system of claim 1, wherein the computer executable instructions are further configured to extract data from the document image, and update a database with the data.

4. The system of claim 1, wherein the set of document templates includes one or more contractual forms, one or more financial forms, and/or one or more identification documents.

5. The system of claim 1, wherein the unidentified file is received as an email attachment.

6. The system of claim 1, wherein the system is configured to operate as an email plugin.

7. The system of claim 1, further configured to be operable with unidentified files of the following file formats: pdf, png, tif, jpg, jpeg, gif, and pnp.

8. The system of claim 1, further configured to be operable when one or more of the at least one account is a prospective account, and wherein the at least one account includes one or more of a list of account types comprising: trust, investment, custody, estate, and banking.

* * * * *